April 15, 1941.    A. D. BLUMLEIN    2,238,770
HIGH FREQUENCY ELECTRICAL CONDUCTOR OR RADIATOR
Filed March 4, 1939
*Fig.1*
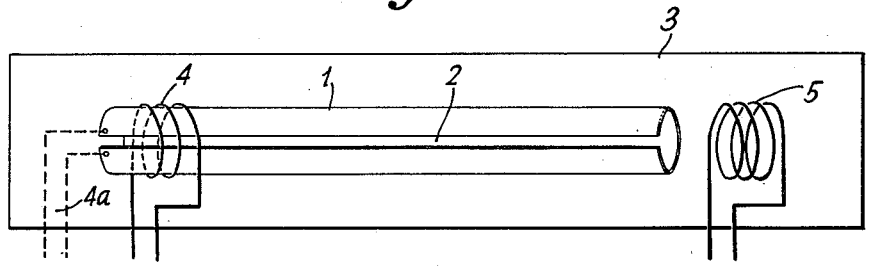
*Fig.2*   *Fig.3*   *Fig.4*   *Fig.5*
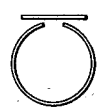  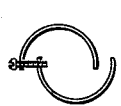 
*Fig.6*
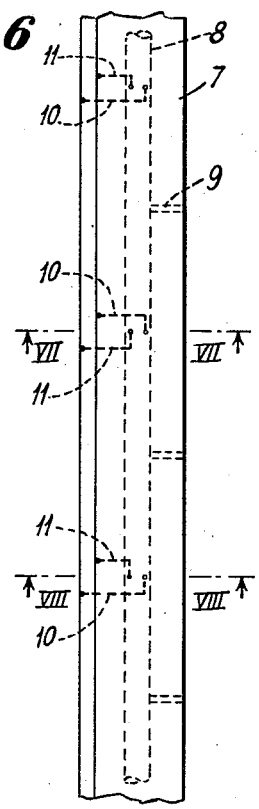
*Fig.7*
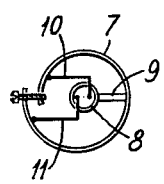
*Fig.8*
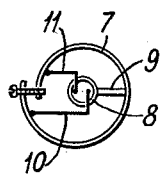
INVENTOR
ALAN D. BLUMLEIN
BY *H. S. Grover*
ATTORNEY Patented Apr. 15, 1941

2,238,770

UNITED STATES PATENT OFFICE 2,238,770

HIGH FREQUENCY ELECTRICAL CONDUCTOR OR RADIATOR

Alan Dower Blumlein, Ealing, London, England, assignor to Electric & Musical Industries Limited, Hayes, Middlesex, England, a company of Great Britain Application March 4, 1939, Serial No. 259,751
In Great Britain March 7, 1938

20 Claims. (Cl. 250—33)

This invention relates to high frequency electrical power transmitting or distributing apparatus and is concerned particularly with signal energy carrying or radiating conductors.

High frequency current conductors at present employed commonly consist of metallic conductors, air being used as the insulating medium. The object of the present invention is to provide a channel for guiding electromagnetic flux for distributing or radiating high frequency electrical power having certain advantages over known forms of conductor.

According to the present invention a conductor or radiator for high frequency electrical power consists of an electrically conducting longitudinal member formed to provide a substantially closed channel for the transmission of magnetic flux and formed with a longitudinal slit, said conductor or radiator constituting a transmission line having inductive series elements and shunt elements comprising inductance and capacity in parallel. In certain constructions of conductor or radiator embodying the invention, means are provided for effecting adjustment of the width of the longitudinal slit. In particular forms of conductor or radiator according to the invention the edges of the slit overlap, means being provided for adjusting the distance between the overlapping surfaces or the extent to which said surfaces overlap in order to control the leakage of magnetic flux, said overlapping surfaces forming a condenser and thus providing with the inductance of the conductor a tuned circuit by which the propagation properties of the conductor or radiator may be controlled.

Energy may be fed to the conductor by connections to the opposed edges of the slit or a coupling coil may be arranged to embrace one end of the conductor. Energy may be taken from the conductor by a coil arranged adjacent any suitable point from which magnetic flux is arranged to leak in an adjustable manner.

A conductor designed to operate in accordance with the invention may be employed as a transmitting aerial for short waves or as a feeder.

In order that the invention may be more clearly understood and readily carried into effect, some forms of conductor embodying the invention and certain applications thereof, will now be described by way of example with reference to the accompanying drawing, in which:

Figure 1 shows diagrammatically one such embodiment,

Figures 2, 3, 4 and 5 show diagrammatically cross sections of alternative forms of conductor, Figure 6 shows diagrammatically an aerial embodying the invention and Figures 7 and 8 are explanatory connection diagrams.

Referring to Figure 1 of the drawing, a copper tubular conductor 1 is shown formed with a slit 2 and may be contained within a housing 3. A coil 4 embracing one end of the conductor is fed with high frequency signal energy from a source not shown, the signal energy being induced in the conductor 1, or alternatively the energy may be fed directly to the conductor by leads 4a shown in dotted lines. The conductor 1 forms a closed channel for the transmission of an oscillatory magnetic flux set up due to the induced signal currents, the flux forming a field at the opposite end of the conductor at which a coil 5 is mounted. Owing to the energy being at a high frequency the flux cannot penetrate the copper (provided this is sufficiently thick with reference to the signal considered) and therefore the flux is constrained to pass along the tube except for a portion which leaks out of the gap. The gap is necessary to prevent the tube forming a short circuited turn which would prevent the flux from entering the tube. The flux induces energy corresponding with the signal energy, in the coil 5.

In Figure 1 no means are shown for adjusting the leakage of magnetic flux through the slit 2 but such means may take various forms. Thus, a plate 6 as shown in Figure 2 may be arranged to cover the gap formed between the edges of the slit, the position of the plate being adjustable in order to intercept the lines of force. Again the edges of the slit may be arranged to overlap, and the distance between the overlapping surfaces made adjustable, means such as insulated bolts being provided for adjustment purposes as shown in Figure 3.

The conductor may be composed of two semicircular sections having their edges overlapping as shown in Figures 4 and 5. Again, although no particular form has been illustrated, the extent to which one edge of the slit overlaps the other may be made adjustable, the distance between the overlapping surfaces remaining substantially constant.

In order that the action of the tubular conductor as a transmitting channel for high frequency magnetic flux may be understood it may be compared with a tube of similar form but composed of insulating material and immersed in a conductive liquid. The copper tube so far as magnetic flux is concerned is analogous to the tube of electrically insulating material and the air within the copper tube and surrounding it so far as magnetic flux is concerned, may be compared with the electrically conductive liquid within and around the insulating tube. The slit in the insulating tube provides a leakage path for current between the liquid within and externally of the tube and in the case of the copper tube the slit forms a leakage path for magnetic flux within and externally of the tube. In the case of an insulating tube in liquid the capacitative currents through the insulator may be balanced against the inductive currents through the slit thus giving no net admittance for one frequency between the inside and outside of the tube. In the case of the copper tube the analogous effect is produced that the inductance of the metal loop formed by the tube may be tuned by the capacity between the two sides of the slit.

The common requirement of a broadcasting aerial that it should radiate equally in all horizontal directions is fulfilled by a vertical antenna radiating vertically polarised waves. Rotation of such an aerial to the horizontal position to cause it to radiate horizontal polarised waves leads to a deep minimum of radiation in the direction of the axis. This may be overcome by employing combinations of dipoles such as a pair of crossed dipoles fed in phase quatrature or a triangle or a square formed of dipoles which are fed in phase.

A simple solution is to use a horizontal loop aerial, a small loop automatically fulfilling the polarisation and directional requirements. An objection to this arises in view of the very small radiation resistance of a small loop leading to excessively high selectivity which may prohibit the use of such an aerial at short wavelengths of the order of those employed in television systems. A section of the cylinder shown in Figure 1 constitutes effectively a small single turn loop of the kind referred to, the previous objection being overcome by reducing the inductance by making the loop in the cylindrical form shown, the length being of the order of one wavelength. The considerable vertical extent of the aerial leads to the further feature that it may have considerable directivity in a vertical plane.

The manner in which an essentially constant circulating current distribution is produced over the considerable length of the aerial may be understood from the following explanation. It is convenient to assume that the cylinder shown in Fig. 1 is of copper and is about one wavelength long, the diameter being $$\frac{\lambda}{30}$$

and that the edges of the slit are adjustably held apart and fed from a high frequency source by conductors as shown in dotted lines at $4a$.

If the distribution of circulating current is examined along the length by a loop encircling the cylinder and having a measuring instrument connected in it, the loop not being shown in the drawing, it will be found that the current distribution rises sharply at one end. If the edges of the slit 2 are progressively brought together, being finally overlapped with a small clearance, the current distribution changes, being more gradual over a greater length of the cylinder. The attenuation first decreases and a state may be reached when the distribution is uniform over the whole length of the cylinder except for a small steady attenuation from the feed point along the cylinder due to radiation and resistance losses, and then a system of stationary waves appear of which the wavelength is at first greater than the wavelength in air, but which approaches this value as the gap is closed further.

The sequence of changes in the current distribution may be explained in terms of the capacity between the edges of the slit 2. The portion of the tube in the vicinity of the slit may be regarded as forming the conductors of a balanced transmission line having series inductance and parallel capacity as in the normal case but having in addition a continuous inductive load in parallel with the capacity formed by the body of the cylinder. An elementary section of such a line would thus be represented in the balanced form by an induction in series in each conductor and a parallel combination of inductance and capacity. The unbalanced form would be represented by an inductance in series in one conductor and a parallel combination of inductance and capacity. When the slit is wide open the shunt capacity is of low value and has a susceptance much less than that of the shunt inductance. Consequently the line has inductance in both series and parallel branches and is highly attenuating.

Closing the slit progressively increases the capacity and reduces the attenuation until a point is reached at which the shunt inductance and capacity tune. In this condition the line has a very high impedance parallel branch so that the attenuation and phase delay are very low, corresponding with the condition of uniform current distribution. Continued closing of the slit produces still greater shunt capacities which may then neutralise the shunt inductance and forms a conventional transmission line but in which the effective value of the shunt capacity is reduced thus increasing the phase velocity.

All the currents flowing in the cylinder are capable of radiating but those flowing in a lengthwise direction near the slit edges substantially neutralizes each other's effects so that there remains the radiated field of the currents circulating round the cylinder. Each elementary section of cylinder therefore behaves as a loop aerial and the resulting radiation may be obtained from the summation of the individual effects with due regard to both phase and amplitude. In the case of equal distribution along the length of the cylinder, the individual currents in the elementary loop sections being of equal magnitude and phase, the radiated contributions add in phase in the equator of the aerial giving a directional maximum in this plane.

Certain experiments have been made with an aluminium radiating conductor of square cross section, one side of which was made adjustable to overlap a turned-in portion of the adjacent side in order to form a long slit. As in the particular mode of use of the conductor the two edges of the slit vary in potential symmetrically with respect to earth, the conductor was fed by balanced feeders connected to the slit edges. In an alternative case the outer sheath of a concentric feeder was connected to the edge of the radiating conductor diagonally opposite the slit and arranged to make contact freely between that edge and the surface of the conductor between it and the slit, the central conductor of the feeder being connected to the opposite edge of the slit. Measurements showed that with the axis of the conductor vertical, it radiated a horizontally polarized wave and the horizontal directional diagram was circular.

The effect of adjustment of the width of the slit on the directional diagram in a plane through the axis obtained by placing the conductor horizontally was to produce a poor directional diagram when the slit was open beyond the tuned position. A better diagram was obtained with the slit adjusted to the tuned position producing uniform current distribution and with the slit closed still further to produce the stationary wave condition, the directional diagram presented two lobes having a minimum between them.

At the frequency of 60 mc. at which the experiments referred to were conducted, the radiator could be end fed and still produce a maximum of radiation in its equator. At 100 mc., however, when the radiator was tuned, the directional diagram was deviated from the equator when end fed. By feeding the radiator at the centre the maximum was restored to the equator. The tilting of the maximum is caused by a phase difference along the length of the radiator, losses in the copper and by radiation producing a propagation constant giving phase shift and attenuation. The propagation constant can be shown to depend on the length of the radiator from the feed point. A long length produces a relatively large phase shift and attenuation and thus a more tilted diagram. To get a symmetrical diagram therefore lengths from feed points must be kept relatively short. As previously indicated, centre feeding of the radiator instead of end feeding may restore the maximum to the equator or more feed points may be employed. Thus at 150 mc. the tilting phenomenon was more pronounced and five feed points distributed uniformly along the length of the radiator produced a satisfactory directional diagram. The five points were fed by five identical feeders branching from a common point.

In the experiments made favourable gains were obtained compared with a half-wave dipole over a small range of frequencies.

Above the critical frequency the propagation velocity is finite, that is to say, there is continuous phase shift along the length of the radiator and there is no attenuation. Thus, unless there is proper matching at the terminations, standing waves will be set up due to reflections. This provides, for example, open ended end fed or short-circuited end fed quarter wavelength aerials or dipoles by combining such aerials. Experiments made to investigate the conditions in which standing waves were set up were made at a frequency of about 150 mc. with a square section copper radiator, the sides of which measured 17 cm. and which was about 60 cm. in length which is just over a quarter of a wavelength. The characteristic impedance and propagation constant for a series of different gap widths was measured by the conventional transmission line method of measuring the input impedance with the far end open and short-circuited. A gap of 1.25 cm. was selected as being about the greatest which could be used without approaching the tuned condition too closely. The results obtained were in reasonable agreement with the theoretical values.

An application of the invention to an aerial is shown in Figures 6, 7 and 8 of the drawing.

Referring to these figures a continuous length of conductor 7 is shown mounted vertically and supported by a hollow metal mast 8 which is connected electrically at intervals by conductors 9 to the electrical centre point of the surface of the conductor 7. Conducting leads 10 and 11 carrying signal currents are led up the mast 8 and brought out at points one half wavelength apart and connected to the conductor 7. Figures 7 and 8 show the method of connection and it will be seen that these figures differ in that the leads 10 and 11 are oppositely connected. The conductor 7 may be composed of separate lengths connected together but it may be possible so to tune the conductor that the phase velocity is sufficiently high to render the use of separate lengths unnecessary.

In the case of a single half wavelength conductor energy may be fed to it by connections to opposite edges of the slit at one end of the conductor and a short circuit connection may be made at the opposite end in order to give a desired form of flux distribution. Alternatively, connections may be made to the opposite edges of the slit at the centre of the conductor, short circuit connections being provided at the opposite ends if desired. Alternatively the radiator may be driven by a coil encircling it.

A length of conductor other than that of a half wavelength may be employed by tuning the slit in the conductor. As shown in Figures 4 and 5 a composite conductor may be formed by overlapping semi-cylindrical sections, tuning being effected as in the case of a single slit. It will be understood that the cross section of the conductor may take various forms and overlapping portions may be arranged to form one or more slits. In addition to the particular forms illustrated in the drawing, for example, a cylindrical conductor may have the adjacent edges turned inwardly towards the centre so that rigid insulating spacers may be clamped in the gap so formed, the whole tube being thus rendered mechanically strong. While in the construction described with reference to Figures 6, 7 and 8, a central supporting mast is provided, if the conductor is made sufficiently strong mechanically so as to be self-supporting, the mast may be dispensed with.

In order that an aerial conductor designed in accordance with the invention shall be efficient over a wide range of frequencies, it is desirable that it should be of relatively large diameter, diameters of the order of 6 inches to 1 foot being practicable for wavelengths of say 5 metres. Conductors having diameters greater than 1 ft. and provided with more than one longitudinal slit may be used in cases in which it is desired to operate over very wide frequency ranges. While straight conductors have been described it will be understood that the invention is applicable to curved or other shaped conductors and they may be of any desired cross-section.

I claim:

1. A conductor for high frequency electrical power comprising an electrically conducting longitudinal member providing a substantially closed channel for the guidance of electro-magnetic flux and formed with a longitudinal slit, said member having a circumferential length substantially less than a half wavelength at the operating frequency, the capacity between the edges of said slit being adjustable with respect to the inductance of said circumferential length to form a tuned circuit for controlling the propagation properties of said conductor.

2. A conductor for high frequency electrical power comprising an electrically conducting longitudinal member providing a substantially closed channel for the guidance of electro-magnetic flux and formed with a longitudinal slit, said member having a circumferential length substantially less than a half wavelength at the operating frequency, the capacity between the edges of said slit being adjustable with respect to the inductance of said circumferential length to form a tuned circuit for controlling the propagation properties of said conductor, the edges of said slit overlapping whereby the leakage of said flux may be controlled.

3. A conductor for high frequency electrical power comprising an electrically conducting longitudinal member providing a substantially closed channel for the guidance of electro-magnetic flux and formed with a longitudinal slit thereon, said member having a diameter of the order of $\frac{1}{30}$ of the wavelength at the operating frequency, the capacity between the edges of said slit being adjustable with respect to the inductance of the circumferential length of said channel to form a tuned circuit for controlling the propagation properties of said conductor.

4. A conductor for high frequency electrical power comprising an electrically conducting longitudinal member providing a substantially closed channel for the guidance of electro-magnetic flux and formed with a longitudinal slit, said member having a circumferential length substantially less than a half wavelength at the operating frequency, the capacity between the edges of said slit being so related to the circumferential length between said edges that a tuned circuit tuned to the operating frequency is formed.

5. A conductor for high frequency electrical power comprising an electrically conducting longitudinal member providing a substantially closed channel for the guidance of electro-magnetic flux and formed with a longitudinal slit, said member having a circumferential length substantially less than a half wavelength at the operating frequency, the capacity between the edges of said slit being so related to the circumferential length between said edges that a tuned circuit tuned to the operating frequency is formed, the edges of said slit overlapping whereby the leakage of said flux may be controlled.

6. A conductor for high frequency electrical power comprising an electrically conducting longitudinal member formed to provide a substantially closed channel and means for so energizing said conductor that a longitudinal magnetic field is set up therewithin from one end to the other, the circumferential length of said channel being substantially less than a half wavelength at the operating frequency, said channel being provided with a longitudinal slit.

7. A conductor for high frequency electrical power comprising an electrically conducting longitudinal member formed to provide a substantially closed channel and means for so energizing said conductor that a longitudinal magnetic field is set up therewithin from one end to the other, the circumferential length of said channel being substantially less than a half wavelength at the operating frequency, said channel being provided with a longitudinal slit, the capacity between the edges of said slit being so related to the inductance of the circumferential length between the edges of said slit that a tuned circuit is formed by which the propagation properties of said conductor may be controlled.

8. A conductor for high frequency electrical power comprising an electrically conducting longitudinal member formed to provide a substantially closed channel and means for so energizing said conductor that a longitudinal magnetic field is set up therewithin from one end to the other, the circumferential length of said channel being substantially less than a half wavelength at the operating frequency, said channel being provided with a longitudinal slit, the capacity between the edges of said slit being so related to the inductance of the circumferential length between the edges of said slit that a tuned circuit is formed by which the propagation properties of said conductor may be controlled, the edges of said slit overlapping to control the leakage of electro-magnetic flux.

9. A conductor for high frequency electrical power comprising an electrically conducting longitudinal member formed to provide a substantially closed channel and means for so energizing said conductor that a longitudinal magnetic field is set up therewithin, the circumference of said channel being substantially less than $$\frac{\lambda}{2\pi}$$

where $\lambda$ is the operating frequency, said channel being provided with a longitudinal slit.

10. A conductor for high frequency electrical power comprising an electrically conducting longitudinal member formed to provide a substantially closed channel and means for so energizing said conductor that a longitudinal magnetic field is set up therewithin, the circumference of said channel being substantially less than $$\frac{\lambda}{2\pi}$$

where $\lambda$ is the operating frequency, said channel being provided with a longitudinal slit, the capacity between the edges of said slit being so related to the inductance of the circumferential length between the edges of said slit that a tuned circuit is formed by which the propagation properties of said conductor may be controlled.

11. A conductor for high frequency electrical power comprising an electrically conducting longitudinal member formed to provide a substantially closed channel and means for so energizing said conductor that a longitudinal magnetic field is set up therewithin, the circumference of said channel being substantially less than $$\frac{\lambda}{2\pi}$$

where $\lambda$ is the operating frequency, said channel being provided with a longitudinal slit, the capacity between the edges of said slit being so related to the inductance of the circumferential length between the edges of said slit that a tuned circuit is formed by which the propagation properties of said conductor may be controlled, the edges of said slit overlapping to control the leakage of electro-magnetic flux.

12. A conductor for high frequency electrical power comprising an electrically conducting longitudinal member formed to provide a substantially closed channel and means for so energizing said conductor that a longitudinal magnetic field is set up therewithin, the diameter of said channel being of the order of $$\frac{\lambda}{30}$$

where $\lambda$ is the operating frequency, said channel being provided with a longitudinal slit.

13. A conductor for high frequency electrical power comprising an electrically conducting longitudinal member formed to provide a substantially closed channel and means for so energizing said conductor that a longitudinal magnetic field is set up therewithin, the diameter of said channel being of the order of $$\frac{\lambda}{30}$$

where λ is the operating frequency, said channel being provided with a longitudinal slit, the capacity between the edges of said slit being so related to the inductance of the circumferential length between the edges of said slit that a tuned circuit is formed by which the propagation properties of said conductor may be controlled.

14. A conductor for high frequency electrical power comprising an electrically conducting longitudinal member formed to provide a substantially closed channel and means for so energizing said conductor that a longitudinal magnetic field is set up therewithin, the diameter of said channel being of the order of $$\frac{\lambda}{30}$$

where λ is the operating frequency, said channel being provided with a longitudinal slit, the capacity between the edges of said slit being so related to the inductance of the circumferential length between the edges of said slit that a tuned circuit is formed by which the propagation properties of said conductor may be controlled, the edges of said slit overlapping to control the leakage of electro-magnetic flux.

15. An aerial for horizontally polarized waves comprising a vertical conductive cylinder having a longitudinal slit along its length, each elemental length of said cylinder comprising a series connected inductance and capacity, all of said elemental capacities and inductances being effectively in parallel, means for energizing said aerial coupled to one end thereof and means for adjusting the width of said slit so that a predetermined vertical directivity is obtained.

16. An aerial for horizontally polarized waves comprising a vertical conductive tube having a longitudinal slit along its length, each elemental length of said tube comprising a series connected inductance and capacity, all of said elemental capacities and inductances being effectively in parallel, means for energizing said aerial thereto and means for adjusting the width of said slit so that a predetermined directivity is obtained.

17. An aerial for horizontally polarized waves comprising a half wave vertical conductive tube having a longitudinal slit along its length, each elemental length of said tube comprising a series connected inductance and capacity, all of said elemental capacities and inductances being effectively in parallel, means for energizing said aerial coupled to one end thereof and means for adjusting the width of said slit so that a predetermined vertical directivity is obtained.

18. An aerial for horizontally polarized waves comprising a half wave vertical conductive tube having a longitudinal slit along its length, each elemental length of said tube comprising a series connected inductance and capacity, all of said elemental capacities and inductances being effectively in parallel, means for energizing said aerial coupled to its midpoint thereof and means for adjusting the width of said slit so that a predetermined vertical directivity is obtained.

19. An aerial for horizontally polarized waves comprising a vertical conductive tube having a longitudinal slit along its length, each elemental length of said tube comprising a series connected inductance and capacity, all of said elemental capacities and inductances being effectively in parallel, means for energizing said aerial coupled to one end thereof and means for so adjusting the width of said slit that longitudinally traveling waves along said conductor are set up and reflection preventing means coupled to the other end of said tube.

20. A transmitting system comprising a number of aerials, each comprising a conductive cylinder according to claim 15, said aerials being arranged to give a predetermined directional diagram, each of said conductors of said system being adjusted so as to be resonant at a predetermined frequency.

ALAN DOWER BLUMLEIN.